United States Patent
Ladabaum et al.

(10) Patent No.: US 7,618,373 B2
(45) Date of Patent: Nov. 17, 2009

(54) MICROFABRICATED ULTRASONIC TRANSDUCER ARRAY FOR 3-D IMAGING AND METHOD OF OPERATING THE SAME

(75) Inventors: Igal Ladabaum, San Carlos, CA (US); Satchi Panda, Fremont, CA (US); Christopher M Daft, Pleasanton, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 728 days.

(21) Appl. No.: 10/959,665

(22) Filed: Oct. 4, 2004

(65) Prior Publication Data

US 2005/0119575 A1 Jun. 2, 2005

Related U.S. Application Data

(63) Continuation-in-part of application No. 10/819,094, filed on Apr. 5, 2004, and a continuation-in-part of application No. 10/367,106, filed on Feb. 14, 2003, now Pat. No. 7,087,023.

(60) Provisional application No. 60/508,481, filed on Oct. 3, 2003, provisional application No. 60/460,638, filed on Apr. 4, 2003.

(51) Int. Cl.
*A61B 8/14* (2006.01)
(52) U.S. Cl. .................... 600/459; 600/472; 600/437
(58) Field of Classification Search ................ 600/447, 600/458–459; 367/103, 155, 157, 181; 310/309, 310/317–318, 334, 336, 363, 365, 367; 381/191
See application file for complete search history.

(56) References Cited

U.S. PATENT DOCUMENTS

| | | | |
|---|---|---|---|
| 4,145,931 | A | 3/1979 | Tancrell |
| 4,341,120 | A | 7/1982 | Anderson |
| 4,670,683 | A | 6/1987 | T'Hoen |
| 4,694,434 | A | 9/1987 | von Ramm et al. |
| 4,736,630 | A | 4/1988 | Takahashi et al. |
| 4,888,746 | A | 12/1989 | Wurster et al. |
| 5,229,933 | A | 7/1993 | Larson, III |
| 5,301,168 | A | 4/1994 | Miller |
| 5,415,175 | A | 5/1995 | Hanafy et al. |
| 5,490,512 | A | 2/1996 | Kwon et al. |

(Continued)

FOREIGN PATENT DOCUMENTS

DE 32 19 223 11/1983

(Continued)

OTHER PUBLICATIONS

ISR PCT/US2004/002740 mailed Jul. 7, 2004.

*Primary Examiner*—Long V Le
*Assistant Examiner*—Nigel Fontenot

(57) ABSTRACT

A capacitive microfabricated transducer array used for 3-D imaging, with a relatively large elevation dimension and a bias control of the elevation aperture in space and time, confers the same benefits of mechanical translation, except that image cross-sections are electronically rather than mechanically scanned, and are registered very accurately in space. The 3-D cMUT, when combined with elevation bias control and convex curvature in elevation, increases the volume interrogated by the electronic scanning, thus improving field of view. Further still, the 3-D cMUT can be combined Fresnel focusing of the elevation section to improve the elevation focus.

17 Claims, 8 Drawing Sheets

U.S. PATENT DOCUMENTS

| | | | |
|---|---|---|---|
| 5,619,476 | A | 4/1997 | Haller et al. |
| 5,627,580 | A | 5/1997 | Nelson |
| 5,651,365 | A | 7/1997 | Hanafy et al. |
| 5,671,746 | A | 9/1997 | Dreschel et al. |
| 5,768,007 | A | 6/1998 | Knipe et al. |
| 5,870,351 | A | 2/1999 | Ladabaum et al. |
| 5,894,452 | A | 4/1999 | Ladabaum et al. |
| 5,944,666 | A | 8/1999 | Hoassack et al. |
| 5,947,904 | A | 9/1999 | Hossack et al. |
| 5,982,709 | A | 11/1999 | Ladabaum et al. |
| 6,004,832 | A | 12/1999 | Haller et al. |
| 6,102,860 | A * | 8/2000 | Mooney ............... 600/443 |
| 6,104,670 | A | 8/2000 | Hossack et al. |
| 6,108,572 | A | 8/2000 | Panda et al. |
| 6,122,223 | A | 9/2000 | Hossack |
| 6,126,602 | A * | 10/2000 | Savord et al. ............ 600/447 |
| 6,159,153 | A * | 12/2000 | Dubberstein et al. ....... 600/443 |
| 6,172,797 | B1 | 1/2001 | Huibers |
| 6,246,158 | B1 | 6/2001 | Ladabaum |
| 6,271,620 | B1 | 8/2001 | Ladabaum |
| 6,292,435 | B1 | 9/2001 | Savord et al. |
| 6,328,697 | B1 | 12/2001 | Fraser |
| 6,381,197 | B1 * | 4/2002 | Savord et al. ............ 367/178 |
| 6,425,869 | B1 * | 7/2002 | Rafter et al. ............ 600/458 |
| 6,436,046 | B1 | 8/2002 | Napolitano et al. |
| 6,461,299 | B1 | 10/2002 | Hossack |
| 6,527,723 | B2 * | 3/2003 | Ossmann et al. ............ 600/459 |
| 6,551,248 | B2 | 4/2003 | Miller |
| 6,562,650 | B2 | 5/2003 | Ladabaum |
| 6,645,145 | B1 * | 11/2003 | Dreschel et al. ............ 600/443 |
| 6,656,123 | B2 | 12/2003 | Jensen et al. |
| 6,676,602 | B1 * | 1/2004 | Barnes et al. ............ 600/443 |
| 6,709,395 | B2 * | 3/2004 | Poland ............ 600/447 |
| 6,749,570 | B2 | 6/2004 | Üstüner et al. |
| 6,795,374 | B2 * | 9/2004 | Barnes et al. ............ 367/138 |
| 7,087,023 | B2 * | 8/2006 | Daft et al. ............ 600/459 |
| 2001/0043028 | A1 | 11/2001 | Ladabaum |
| 2003/0048698 | A1 | 3/2003 | Barnes et al. |
| 2004/0049110 | A1 * | 3/2004 | Cai et al. ............ 600/437 |
| 2004/0160144 | A1 | 8/2004 | Daft et al. |
| 2005/0261589 | A1 * | 11/2005 | Daft et al. ............ 600/459 |
| 2006/0173342 | A1 * | 8/2006 | Panda et al. ............ 600/459 |

FOREIGN PATENT DOCUMENTS

| | | |
|---|---|---|
| EP | 0 978 822 A2 | 2/2000 |
| WO | 0030543 | 6/2000 |

* cited by examiner

MICROFABRICATED ULTRASONIC TRANSDUCER ARRAY FOR 3-D IMAGING AND METHOD OF OPERATING THE SAME

CROSS-REFERENCE TO RELATED APPLICATIONS

The present application claims priority to U.S. Provisional Application Ser. No. 60/508,481 filed Oct. 3, 2003, and is a continuation-in-part of, and claims the benefit of priority under 35 USC 120 from, commonly-owned U.S. patent application Ser. No. 10/819,094, filed Apr. 5, 2004, to Panda et al. (hereinafter, "the '094 application") and its previously filed Provisional Application 60/460,638, filed Apr. 4, 2003, entitled "Method and Apparatus for Improving the Performance of Capacitive Acoustic Transducers using Bias Polarity Control and Multiple Firings," the contents of which are incorporated herein by reference in their entirety and for all purposes, and which is a continuation-in-part of commonly-owned U.S. patent application Ser. No. 10/367,106 filed Feb. 14, 2003, now U.S. Pat. No. 7,087,023, entitled "Microfabricated Ultrasonic Transducers with Bias Polarity Beam Profile Control and Method of Operating the Same," the content of which is incorporated herein by reference in its entirety and for all purposes.

FIELD OF THE INVENTION

The present invention generally relates to the field of ultrasonic transducers. More specifically, the present invention relates to capacitive microfabricated ultrasonic transducers with bias control and methods of operating the same for 3-D imaging.

BACKGROUND OF THE INVENTION

Currently, the most common forms of ultrasound imaging systems generate two-dimensional images of a cross-section of the subject of interest by electronically scanning an assembly of piezoelectric elements in either linear format or sector format. FIGS. 1A and 1B illustrate the naming conventions used in ultrasound engineering. FIG. 1A illustrates the conventions of orientation and direction. As shown in FIG. 1A, the transducer 100 is typically made up of multiple transducer elements 110. The transducer elements 110 are oriented such that their lengths are along the elevation axis, and their widths are along the azimuth axis. The transducer elements 110 are adjacent to one another along the azimuth axis. FIG. 1B illustrates the linear 210 and sector 220 image formats generated by a typical ultrasound system. As shown in FIG. 1B, in linear format 210 scanning, time delays between transducer elements are used to focus the ultrasound beam in the image plane. Also shown in FIG. 1B, in sector format 220 scanning, time delays between transducer elements are used both to focus the ultrasound beam and to steer it.

Ultrasound systems that generate three-dimensional (3-D) images of the subject of interest are also available. Most of the commercially available systems form three-dimensional images from multiple two-dimensional (2-D) slices taken by a mechanically translating or rotating probe. An example of such a system is General Electric's Voluson 730, which has its origins the work of Kretz in Austria. U.S. Pat. No. 4,341,120, issued in 1982, describes a multi-element probe that is electronically scanned in the azimuth direction, but is mechanically moved to capture image slices in the elevation direction.

Mechanical translation suffers from several disadvantages, among them cost, reliability, and mechanical jitter. The resolution of the reconstruction of the image in the elevation direction is a function of the slice thickness of the elevation profile of the transducer, as well as of the positioning accuracy of the mechanical translation scheme.

Other approaches to 3-D imaging are also known in the art. Systems based on two dimensional transducer arrays are taught in, for example, U.S. Pat. Nos. 4,694,434, 5,229,933 and 6,126,602. One disadvantage of 3-D imaging systems based on 2-D transducer arrays is that the interconnect that connects an individual transducer element to it's controlling circuitry can be difficult and expensive to design and manufacture.

Given the acceptance of the mechanical scanning format, and the system infrastructure already available, it would be advantageous to provide for probes that offer the three-dimensional imaging capabilities of mechanical scanning and improvements thereon without the detriments of mechanical scanning. Thus, a probe capable of being electronically scanned in the elevation direction, in a manner analogous to mechanical translation, is desirable.

Recently, capacitive microfabricated ultrasonic transducers (cMUTs) have been demonstrated to be viable alternatives to piezoelectric transducers. In U.S. Pat. No. 6,271,620 entitled, "Acoustic Transducer and Method of Making the Same," issued Aug. 7, 2001, Ladabaum describes capacitive microfabricated transducers capable of competitive acoustic performance with piezoelectric transducers.

Several inventors have recently described aspects of controlling MUTs with bias voltage. In commonly owned U.S. Pat. No. 7,087,023, the use of bias polarity patterns to control both the phase profile and the aperture in elevation is taught. Bias polarity provides aperture control that is equally effective in transmit and in receive. In commonly owned pending U.S. patent application Ser. No. 10/819,094 to Panda et al., methods of combining bias polarity patterns and multiple firings are taught which enable the cancellation of transducer-emitted harmonics and optimized beam profile control, among other advantages. Savord et al., in U.S. Pat. No. 6,381,197 describe elevation apodization, and elevation focusing by time-based expansion of the receive aperture. In published U.S. application 2003/0048698, Barnes et al. describe a method and system providing bias control of cMUT sub-elements. None of these references teaches or claims specific structures or methods directed to 3-D imaging.

It has been realized by the present inventors that a transducer array with a relatively large elevation dimension and bias control of the elevation aperture in space and time confers the same benefits of mechanical translation, except that image cross-sections are electronically rather than mechanically scanned. It has been further realized by the present inventors that elevation bias control in combination with convex curvature in elevation increases the volume interrogated by the electronic scanning, thus improving field of view. In U.S. patent applications Ser. Nos. 09/435,324 and 10/367,106 Ladabaum et al. teach various structures and methods of curvilinear microfabricated ultrasonic transducers. Further still, the present inventors realized that a fixed mechanical lens for elevation may not be compatible with an electronically scanned aperture, but that Fresnel focusing of the elevation section can be used to improve the elevation focus. Yet another advantage of electronic translation of the elevation aperture is that the accuracy of the position of the elevation slice can be controlled to approximately 100 microns, so that multiple slices can be used to improve 2-D images.

Thus, what is needed is an ultrasonic transducer, system, and method of control, characterized by a readily-manufacturable interconnect scheme, capable of capturing multiple image slices tightly spaced in elevation to form a 3-D image with an adequate field of view, such that mechanical motion of the transducer elements is not needed. The present invention provides such a transducer, system, and method.

SUMMARY OF THE INVENTION

The present invention provides a capacitive microfabricated transducer array with a large elevation aperture, array elements connected to transmit and receive circuitry with azimuth connections, and bias line control of subsets of each array element's constituent diaphragms aligned in the elevation direction. A significant part of the aperture is off for a transmit-receive cycle. An off region of the aperture is implemented by alternating the bias in the elevation electrodes with sufficiently fine spatial resolution so as to cancel the acoustic fields generated and received by the affected elements. Alternatively, the elevation aperture can be turned off by applying a sufficiently high bias such that membranes touch down on the substrate, and thus do not respond at the frequencies of interest. Yet another way to selectively turn off a region of aperture is to provide zero bias to that region. Translation of the aperture is achieved by applying a different off-region bias pattern between sets of transmit-receive cycles such that each set of transmit-receive cycles is centered about a different elevation region. Alternatively, the amplitude distribution in elevation of the bias can be varied in time to provide aperture translation. Electronic focus of the active elevation aperture is achieved by providing a time varying amplitude of bias during receive, or by providing a Fresnel zone pattern of bias polarity alternation across the active elevation region during both transmit and receive, or a combination of both. A simple interconnect scheme is achievable with a microfabricated transducer by splitting the common electrode, which is usually continuous, into several elevation electrodes. Each elevation electrode can be connected to bias control circuitry, which in one exemplary embodiment can simply be extra transmit channels of a conventional imager. A clinically useful field of view is provided by curving the array in the elevation direction.

BRIEF DESCRIPTION OF THE DRAWINGS

The present invention will become more apparent from the detailed description set forth below when taken in conjunction with the drawings in which like reference characters identify corresponding items throughout and wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples discussed below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Figure 1A:
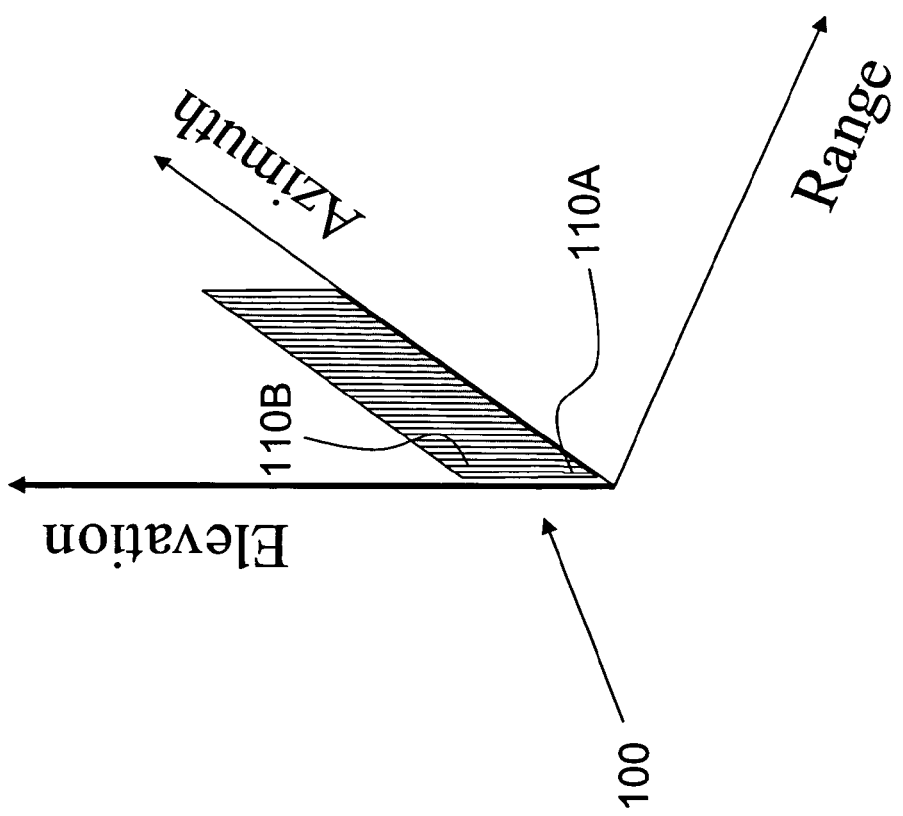
FIG. 1A illustrates a typical medical ultrasonic transducer and defines the azimuth, elevation, and range directions.
Figure 1B:
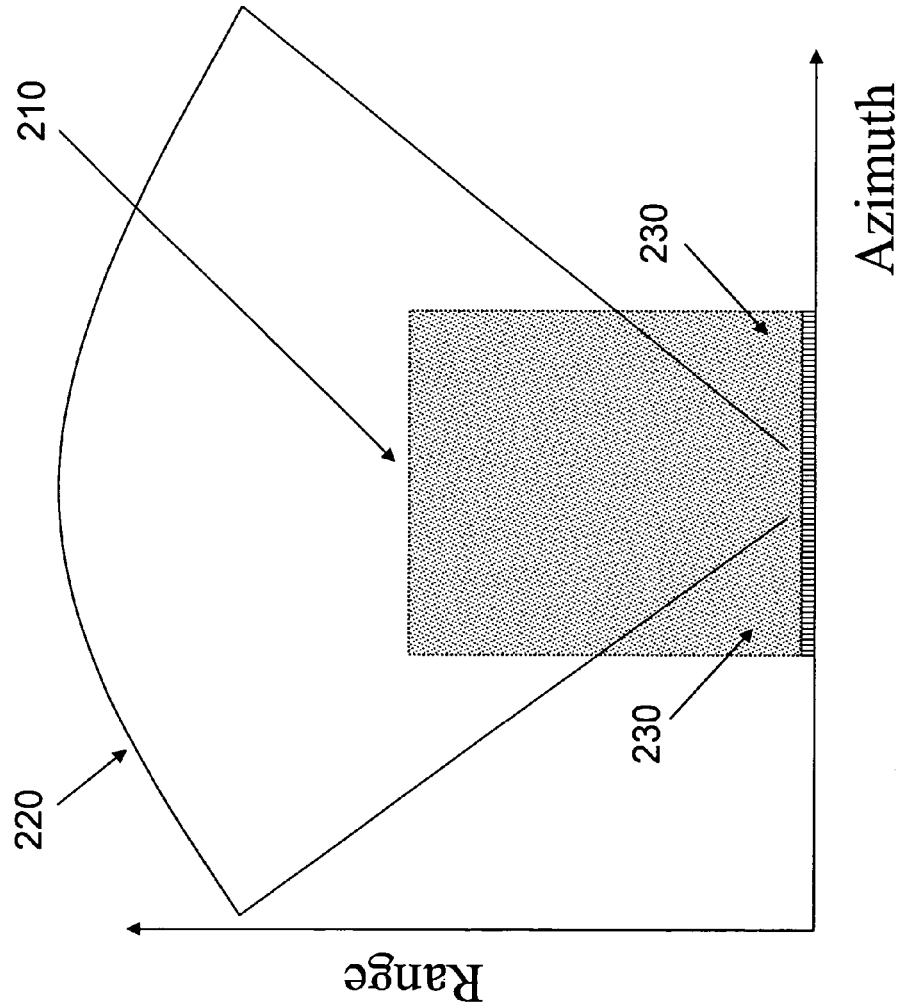
FIG. 1B illustrates the sector and linear image formats generated by a typical ultrasound system.
Figure 2:
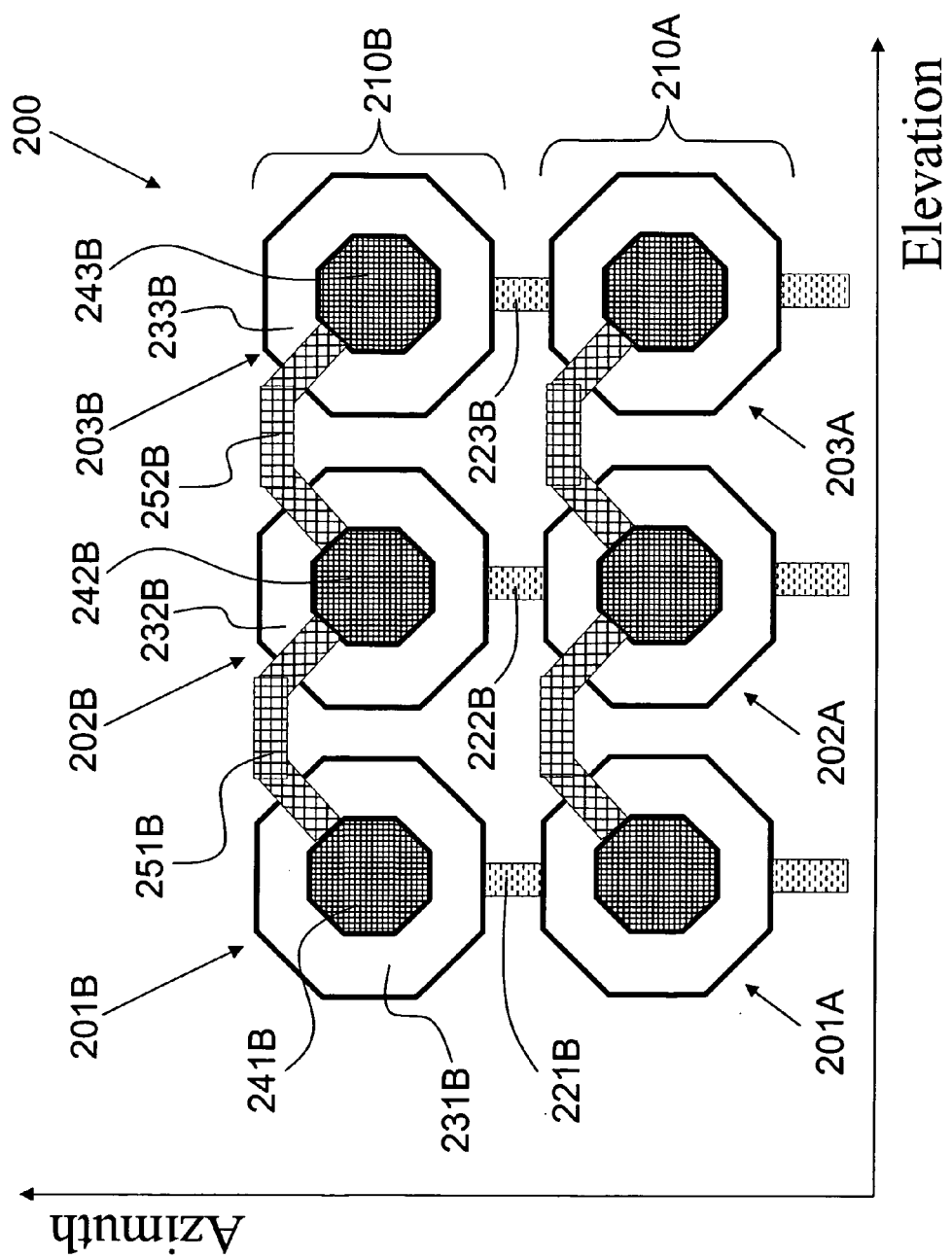
FIG. 2 illustrates a top view of a transducer as used in one embodiment of the present invention.
Figure 3:
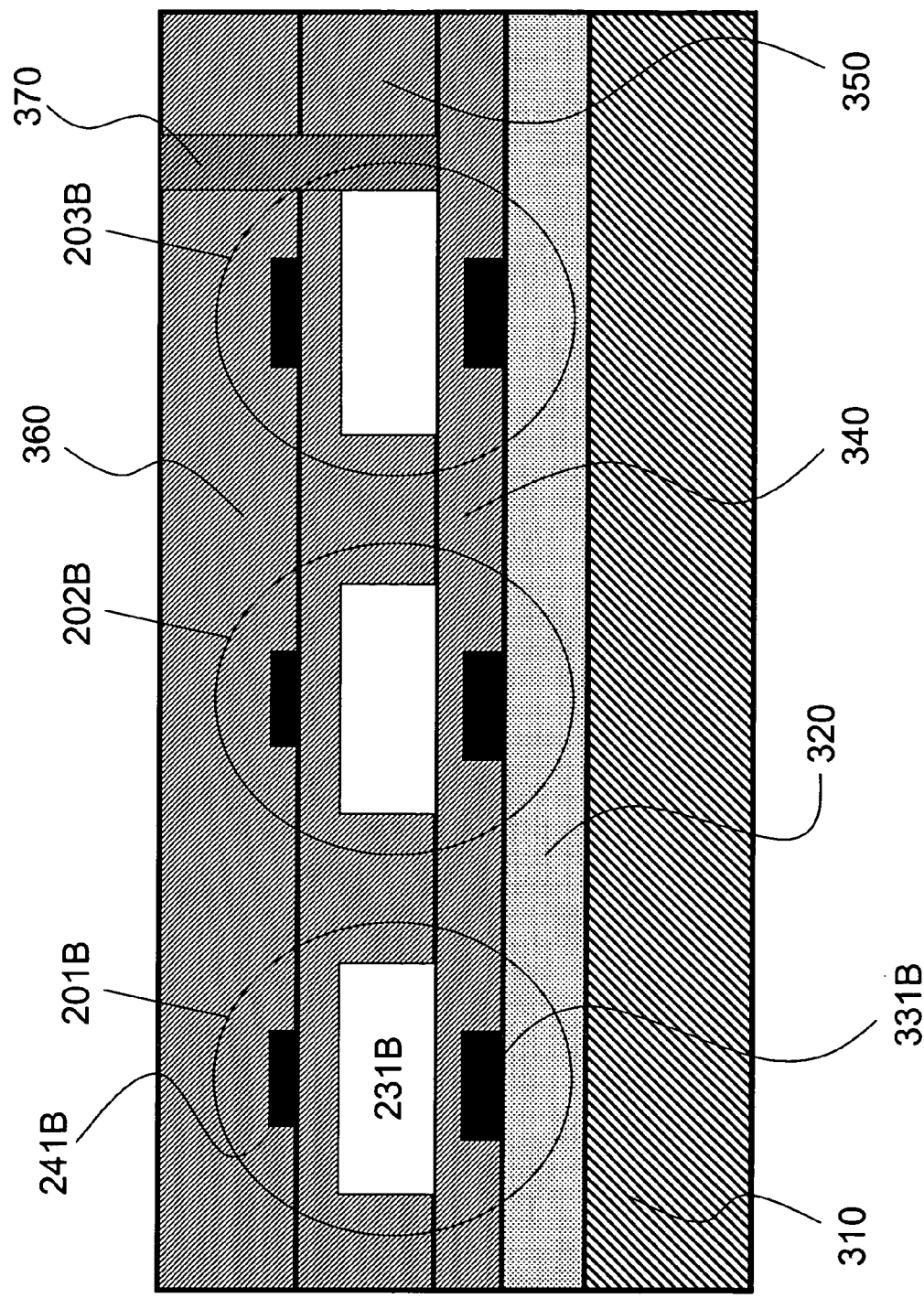
FIG. 3 illustrates a cross-section view of a transducer as used in one embodiment of the present invention.

FIGS. 2 and 3 illustrate a cMUT array formed according to an embodiment of the present invention. It will become apparent to one skilled in the art that any number of transducer cells can make up a transducer element, and any number of transducer elements can make up a cMUT array. The present invention is intended to incorporate this variability, and not be limited to the exemplary embodiments provided.

FIG. 2 illustrates a top view of an embodiment of a cMUT array 200 according to the present invention. As shown in FIG. 2, the cMUT array contains two transducer elements 210, with each of the transducer elements containing three transducer cells 201, 202 and 203. The cMUT array 200 can, for example, be similar to that disclosed in U.S. Pat. No. 6,271,620 issued Aug. 7, 2001 to Ladabaum and entitled "Acoustic Transducer and Method of Making the Same." Transducer element 210B contains three transducer cells 201B, 202B and 203B. Each of the transducer cells 201B, 202B and 203B has a top electrode 241B, 242B and 243B, respectively, and a bottom electrode (shown in FIG. 3), and a void region 231B, 232B and 233B, respectively. Transducer cells 201B, 202B and 203B are interconnected along their top electrodes 241B, 242B and 243B in the elevation direction by intra-element interconnects 251B and 252B. Alternatively, in another embodiment, transducer cells could be connected along the lower electrodes. Corresponding transducer cells 201A-201B, 202A-202B and 203A-203B of adjacent transducer elements 210A-210B are interconnected in the azimuth direction by inter-element interconnects 221B, 222B and 223B to form elevation rows. The cross section 3-3 of FIG. 2 is shown in FIG. 3.

FIG. 3 illustrates a cross-section of transducer element 210B of an embodiment of the present invention. As shown in FIG. 3, transducer cells 201B, 202B and 203B are formed using the methods, for example, disclosed in co-owned U.S. patent application Ser. No. 09/898,035 filed Jul. 3, 2001 to Ladabaum and entitled "Method for Making Acoustic Transducer." Illustratively, transducer cell 201B can be constructed in the following manner. A layer of thermal oxide 320 is grown over a substrate 310. A first conductive layer is then deposited and etched to form the lower electrode 331B. Thereafter, a lower insulation layer 340 is deposited. On top of the lower insulation layer, a sacrificial layer is deposited and etched, resulting in sacrificial portions that will ultimately become the void region 231B. A middle insulation layer 350 is deposited over the sacrificial portions. A second conductive layer is then deposited and etched to form the upper electrode 241B. A top insulation layer 360 is then deposited over the top electrode 241B. At this point, the sacrificial portions are etched away through via holes, with the via holes being subsequently filled with insulation material 370.

The present invention is not meant to limit the specific exemplary geometries of and methods of making the above-described transducer elements and cells. Additionally, the size and shape of the transducer cells are not meant to be limited to a single octagonal design; rather, each transducer cell could be a different size and a different shape from each of the other transducer cells.

Figure 4:
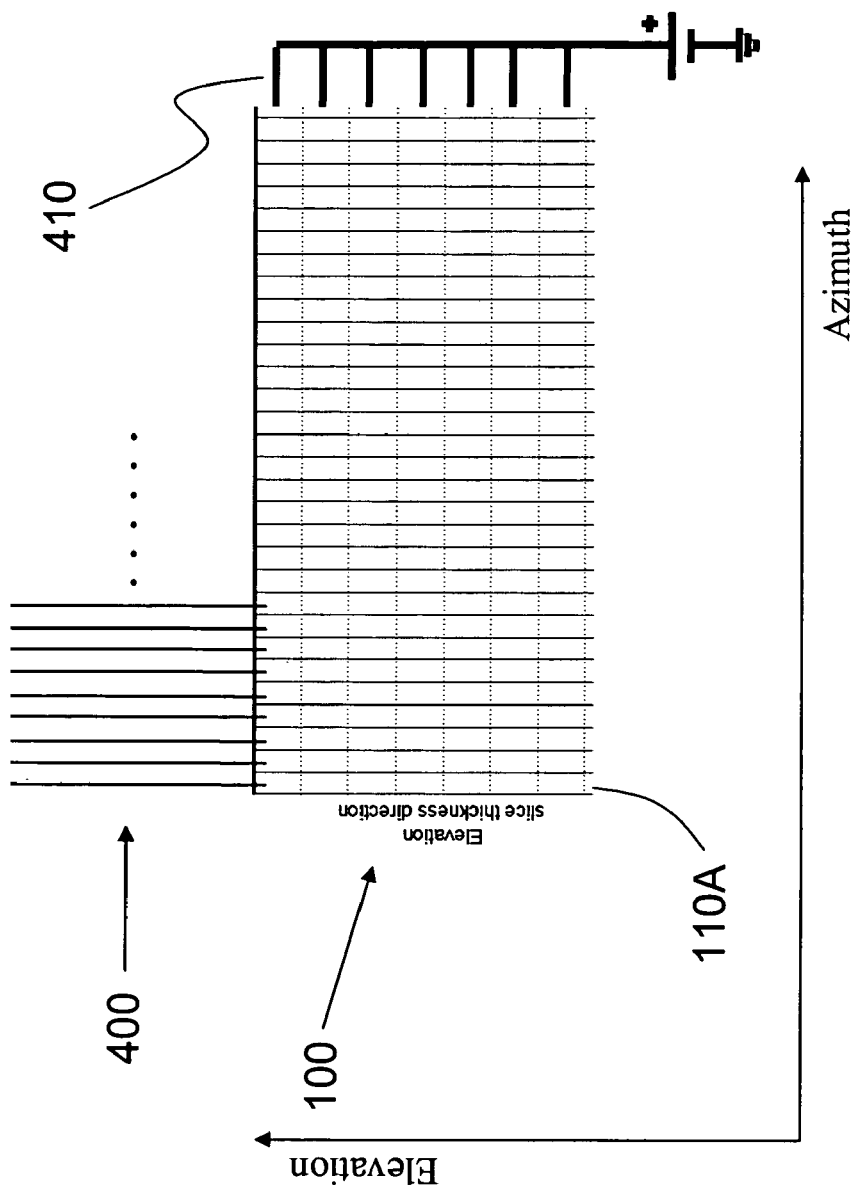
FIG. 4 illustrates the electrical schematic for the conventional transducer system, which can be used with an embodiment of the present invention.

FIG. 4 shows the traditional cMUT array 100 external circuit connections. As shown, typically one azimuth element connection 400 is connected to the top (or bottom) electrode of one series of transducer cells making up a transducer element 110A of the traditional cMUT array 100. All of the bottom (or top) electrodes of the cMUT array 100 are commonly connected 410 and, therefore, commonly biased.

Figure 5:
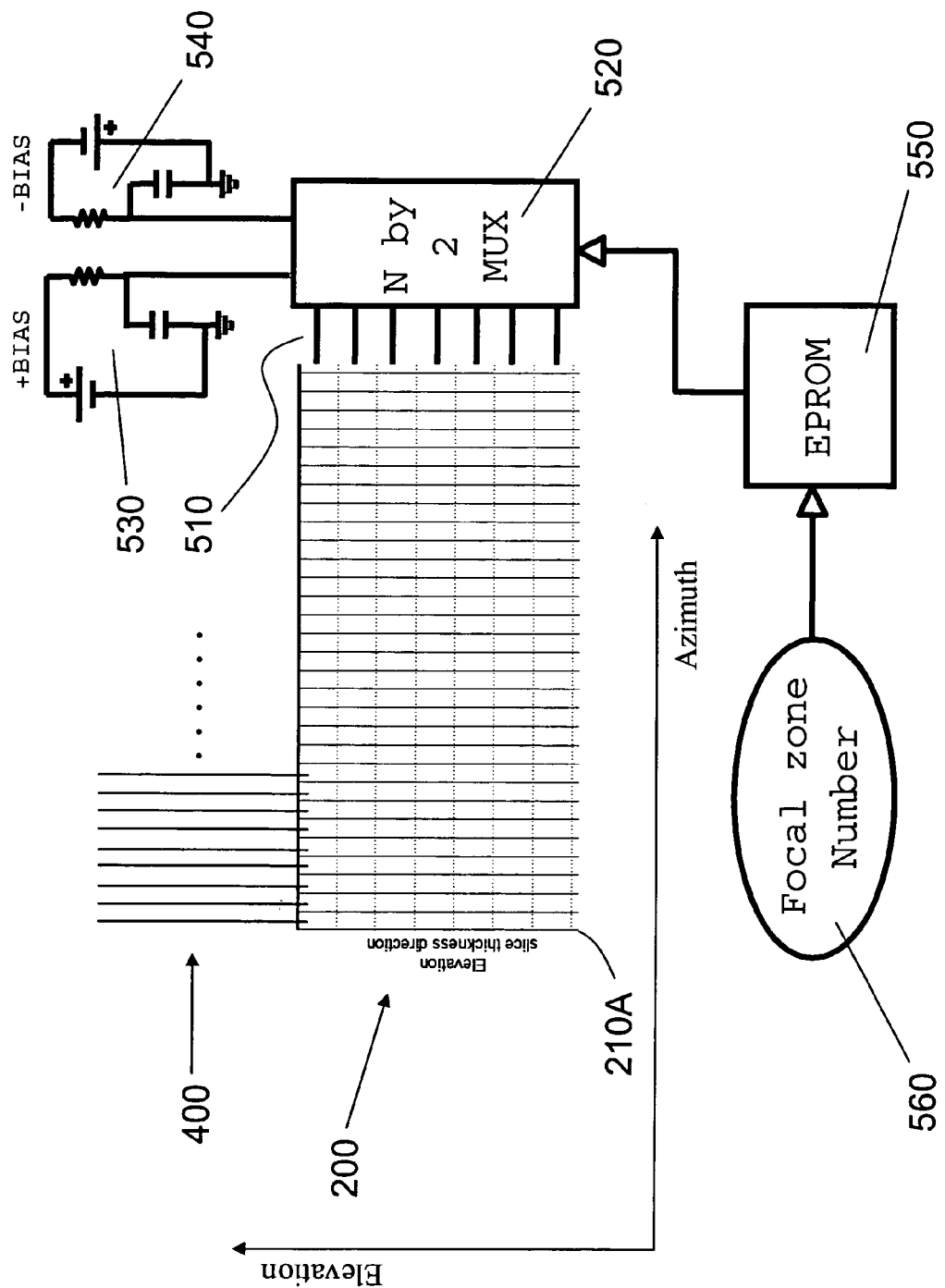
FIG. 5 illustrates another electrical schematic for a transducer system used with an embodiment of the present invention.

FIG. 5 shows the cMUT array 200 external circuit connections used with an embodiment of the present invention. As with the traditional array of FIG. 4, the top electrode of each transducer element 210A is connected externally to an azimuth element connection 400. However, in this external circuit, the bottom electrodes of corresponding transducer cells of adjacent transducer elements are connected together to form elevation rows. Each elevation row is externally connected 510 to a separate output channel of an N by 2 multiplexer 520. The multiplexer 520 inputs are a positive 530 and negative 540 bias voltage. The multiplexer 520 control signal comes from an EPROM 550 lookup table using a focal zone and aperture position/size number 560 pointer. As will be readily apparent to those skilled in the art, other approaches to transducer control that are currently available in the art can also adapted to the 3-D aspects of the present invention. For example, applying different bias amplitudes in the elevation direction, as first taught by Savord with respect to MUT elevation aperture apodization, can be used to turn certain regions of the elevation aperture off.

Further still the dynamic aperture aspects of varying the bias amplitudes in time such that the elevation aperture widens in time in order to provide elevation focus, as first taught by Savord with respect to MUTs, can be used in connection with the 3-D cMUT of the present invention. The variation of bias polarity patterns can be used in a dynamic manner similar to the variation of bias amplitudes to provide an enlarging aperture and thus elevation focus. In such cases of more demanding bias line control, box 520 of FIG. 5 would not be a simple N by 2 MUX, but rather a bias control network. For example, the system supplying 3-D control to the cMUT of the present invention, in order to avoid acoustic emission during switching of the elevation rows, might provide for smooth switching through the use of a digital to analog converter, or a resistor ladder, or a filter, etc., or a combination of such elements. The waveforms supplied to the elevation row bias lines can have a smooth shape and frequency content outside the acoustic passband of the MUT cells.

Figure 6:
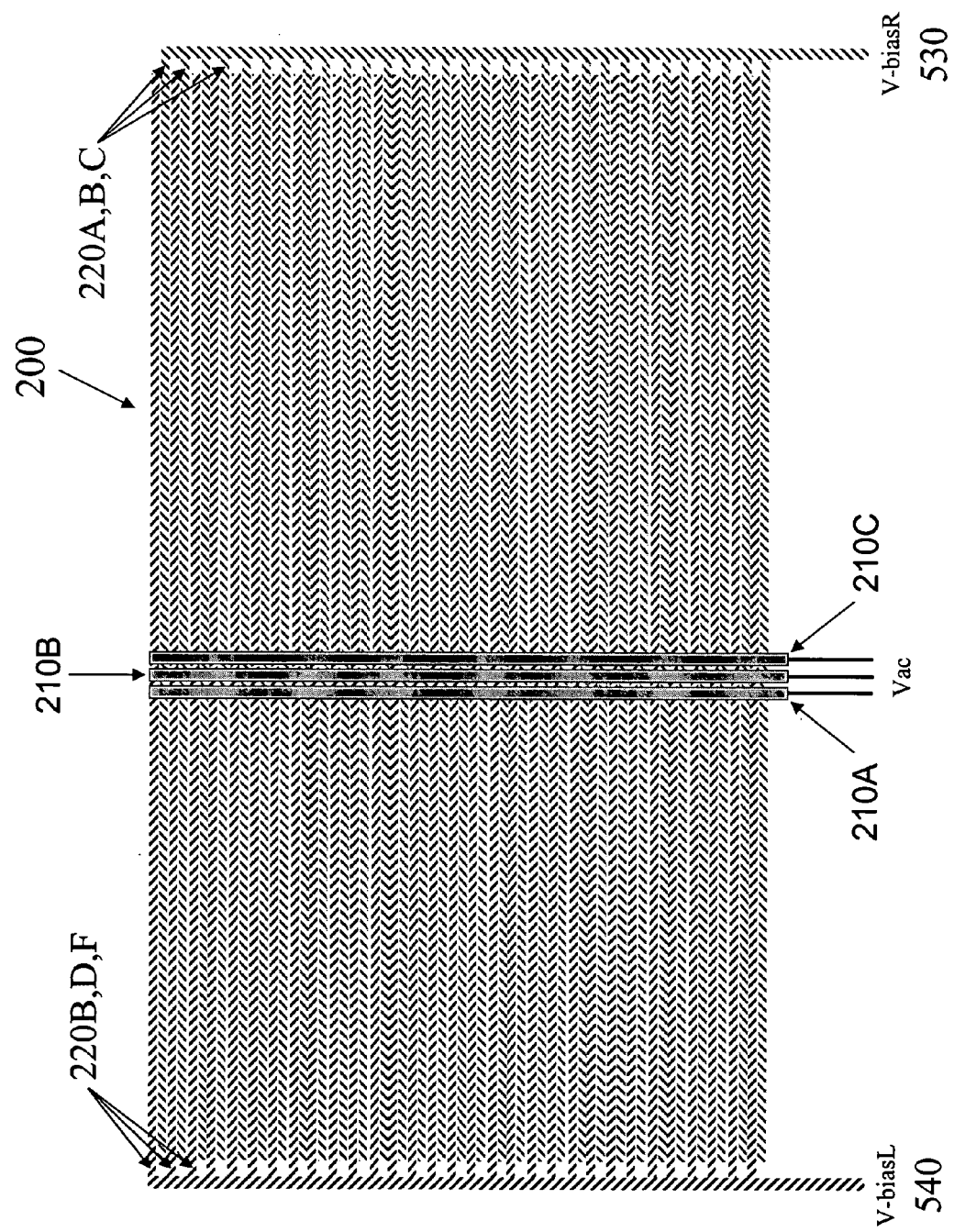
FIG. 6 illustrates the transducer design according to an embodiment of the present invention.

FIG. 6 illustrates a simplified version of the MUT transducer for the purpose of explaining one embodiment of the present invention. Transducer 200 contains connections along the elevation direction that define azimuth elements 210A, 210B, and 210C. Azimuth elements are connected to the transmit/receive circuitry of the ultrasound system. Only three azimuth elements are shown for simplicity, but any number of such elements are in the scope of the present invention. Transducer 200 also contains connections in the azimuth direction that define elevation row bias lines 220. Subsets of elevation row bias lines 220, such as 220A,C,E and 220B,D,F are connected to two bias sources 530 and 540, forming elevation bias subsets. Only two elevation row bias line sets are illustrated for clarity, though any number of such connections and bias sources are possible. To reduce crosstalk in the system incorporating the 3-D capable cMUT of the present invention, the impedance of the bias electrode line 220A together with the RF path to ground of the voltage source 530 (i.e., the effective RF ground) should be on the order of about 1000 times, or more, smaller than the absolute electrical impedance of the cMUT sub-element that such a bias electrode line controls.

In an embodiment of the present invention, a transducer array with a relatively large elevation dimension and bias control of the elevation aperture in space and time confers the same benefits of mechanical translation, except that image cross-sections are electronically rather than mechanically scanned. According to the present invention, the image cross-sections are electronically scanned by separately transmitting and/or receiving at a desired frequency range from some region of the elevation aperture, while not transmitting and receiving at the desired frequency range from the remainder of the elevation aperture. The temporal and spatial transmission and/or reception can mimic the mechanical translation across the traditional 3-D transducer elements if elevation row bias lines 220 receive the appropriate bias voltages then sequentially turn regions of the elevation aperture on and off in a back and forth manner.

However, 3-D cMUT according to the present invention is not limited to mimicking the back-and-forth motion as in the typical mechanical-scanning counterpart. As will be apparent to those skilled in the art, the 3-D cMUT operation can separately transmit-receive from an elevation region at any given time. For instance, in an embodiment of the present invention, an elevation subset 220 near one edge of the elevation aperture could transmit-receive first, followed alternately by another subset 220 around the opposite edge of the elevation aperture.

Additionally, the 3-D cMUT according to the present invention is not limited by first transmitting from a particular aperture region and then being forced to wait for the reception at that particular elevation region before moving to a different elevation aperture location from which to transmit-receive as does the typical mechanical-scanning counterpart. For example, in another embodiment of the present invention, one elevation region might transmit and then, prior to reception by the first elevation region, a second elevation aperture region might transmit. Then the first elevation region can receive, followed by reception by the second region. This aspect of the present invention is facilitated by the time it takes sound to propagate and the switching speeds possible in the system. In yet another aspect of the present invention, the transmit signal of different elevation aperture region can be encoded such that multiple transmit firings occur quickly from different regions, and reception occurs simultaneously. One example of the encoding is to use different frequency bands for different transmit waveforms such that during reception, a frequency filter can be applied to extract the spatial zone. These alternative embodiments are meant as examples of the different operational possibilities of the present invention and not as limiting aspects. As will be readily apparent to those skilled, there exist many combinations of transmit and/or receive options from one or more of the elevation regions of the cMUT array of such elements, all of such combinations are included within the scope of the present invention.

The manner in which some elevation rows do not transmit and receive at the desired frequency is another embodiment of the present invention. In one aspect of this embodiment, the non-transmitting/receiving elevation regions of the cMUT array contain an "alternating" bias profile designed to suppress, or cancel, radiation of the fundamental frequency (and more generally, radiation of all odd harmonic frequencies), where the bias voltages are typically on the order of +/− 150 volts, depending on cell design and gap. Such a bias profile is characterized by adjacent regions of opposite bias polarity that are spaced as finely as allowed by the bias-blocks. Typically, spatial periodicity depends on the frequency of operation and range at which cancellation is sought; however, periodicity of ½ wavelength is sufficient. Specifically in this aspect of the present invention, those transmit/receive phase profiles that alternate with sufficient spatial periodicity between 0 and π from bias-block to bias-block prevent the corresponding frequency component from radiating into, or being received from, the field, provided that the pitch between adjacent bias blocks is smaller than one wavelength at that fundamental frequency.

In another aspect of this embodiment, the non-transmitting/receiving elevation rows of the cMUT array are biased with a relatively large bias voltage in order to "pin" the vibrating drum of each transducer cell. This state is also referred to "collapse turn-off." Alternatively, turn-off can be achieved in the receive portion of non-receiving elevation rows by simply applying a zero bias to those elements. Turning off the receive portion in this manner is especially effective when combined with dynamic receive focusing, that is, by smoothly turning on and increasing the bias from the center of the aperture region of interest to the full aperture region of interest with a time-profile linked to the speed of sound in the medium of interest. Similarly, the application of zero bias might also be used to achieve effective turn-off in the transmit portion non-transmitting elevation rows because, although some transmission will occur, its frequency content will be largely shifted to twice the frequency of the transmit signal, and thus filtered out on receive.

In yet another aspect of the present invention, referring to the operation of the circuit connections as shown in FIG. 5, the sign of the bias to some of the elevation row bias lines 220 in the transmitting/receiving region of interest is changed in order to invert the phase of the transmit signal for some of the elevation row bias lines 220. This has the effect of creating a Fresnel zone plate. This focusing can be accomplished on transmission as well as reception. However, for simplicity, the following description will be in terms of the transmission, but reception operates in a similar manner. For the following description it should remain understood that, at any given time, the focusing is only being performed on the actively or functionally transmitting/receiving elevation region, while the remaining portions of the elevation aperture are not in effect.

The multiplexer routes either the positive or negative bias voltage to the N elevation row bias line connections, based on a lookup table in the EPROM 550. Each elevation row bias line is an RF ground. The EPROM 550 address is, for example, a number provided by the system, based on excitation voltage timing, which tells the probe which focal zone is in use, and optionally information about the center frequency and bandwidth of the excitation pulse. Data in the EPROM 550 converts this to the bias sign arrangement for a given focal zone, and the focal length of the zone plate is determined by these bias signs.

The zone plate, as described above in this embodiment of the present invention, operates similarly to a classical Fresnel lens, but is adapted to cMUT elevation focusing. For example, if the center of the elevation electrode is located at $y_i$, then the phase $\phi_i$ required for focusing in a classical Fresnel lens is:

$$\phi_i = \frac{2\pi f}{c}\sqrt{r^2 + y_i^2} - r,$$

where f is the frequency, r is the desired focusing range, and c is the speed of sound in the medium of interest. However, the present invention does not provide for continuous phase-shifting, as in a classical Fresnel lens. Rather, the present invention provides for discrete 180 degree phase shifts; it is essentially a cMUT zone plate. Therefore, the ideal continuous phase variation must be converted to discrete sign information to give the cMUT bias voltages: $s_i=\text{sign}(\text{mod}(\phi_i,2\pi)-\pi)$.

It will be understood by those skilled in the art that there are numerous methods and circuits by which positive and negative bias voltages can be connected to and combined with the elevation rows of the present invention. These additional bias voltage connection methods and circuits are meant to be included within the scope of the present invention.

Specifically, in another embodiment, the multiplexer-EPROM combination of the present invention can be replaced with any commonly known switching and selection circuitry combination. For example, such components as: discrete relays, discrete transistors, solid state transistors and other solid state switches can be used. Likewise, instead of the EPROM storing multiple, real-time selectable, polarity patterns, a manual pattern selection circuit can be used. Further, the positive and negative bias voltages of the present invention can be hard-wired directly to the elevation rows or directly to the switching components. In this embodiment, the polarity pattern for a particular application is pre-selected and the appropriate bias voltage directly connected to the appropriate elevation row, or elevation row switch, according to the pre-selected polarity pattern. Finally, in this embodiment, the MUT device of the present invention can have a combination of hard-wired and switched bias voltages.

In a further embodiment, the positive and negative bias voltages can either be discretely generated off of the MUT device of the present invention, be generated locally with the MUT device of the present invention, or be a combination of discretely and locally generated. In the first aspect of this embodiment, discrete generation, the bias voltages can, for example, be included in the application probe handle or be generated elsewhere in the application system. In this aspect, the bias voltages can, for example, be tied to the MUT device using wires, cables, harnesses, connectors, and the like. In the second aspect of this embodiment, local generation, the bias voltage generation circuitry can be included beside the MUT device, on the same or an adjacent die, or beneath the MUT device, within the MUT device substrate.

In yet another embodiment, the positive and negative bias voltages can be more numerous than the two shown in FIG. 5. Specifically, in operation, each MUT elevation row can, for example, have its own particular bias voltage, that bias voltage being a particular combination of amplitude and polarity. Further, each particular bias voltage might be a time based waveform, which can allow for the smooth opening of a aperture in time. The smooth opening of aperture in time might also be achieved using a resistor ladder from center out. Additionally, in this embodiment, the quantity of bias voltages could outnumber the quantity of elevation rows, with some bias voltages being used for certain applications, while others are used for different applications.

For best image quality, it is necessary to be able to reduce the elevation aperture in the near field. Alternating the bias, as in an embodiment of the present invention, when the elevation electrodes are on the order of half wavelength across, is an effective method to cancel the sound output and can be used for aperture control and apodization. FIG. 6 illustrates an example of such an approach.

FIG. 6 illustrates a specific design of an exemplary embodiment of the present invention where 3 azimuth elements 210A-C of a cMUT array 200 are connected to a transmit channel. Not shown in FIG. 6 are the additional azimuth elements that would be along side the 3 azimuth elements 210A-C. Also not shown in FIG. 6 is the additional elevation extent of elements 210A-C. The entire array might consist of 128 azimuth elements and 128 elevation electrodes with a 4 MHz center frequency and might measure 4.8 cm in azimuth and 2.4 cm in elevation. However, as will be apparent to those skilled in the art, any number of azimuth elements and elevation electrodes designed for any desired center frequency could be used. The array 200 contains an elevation section, as illustrated, with two sets of elevation electrodes 220A,C,E and 220B,D,F, which each contain the elevation row bias lines 220 referred to previously. FIG. 6 illustrates the alternating polarity of elevation row bias lines that can effectively turn off the elevation section of array 200 depicted in the figure. These electrodes are approximately 150 microns wide, and connect the cMUT cells of adjacent elements 210A, 210B, and 210C in an alternating (i.e., interdigitated) manner to bias voltage V-biasL 540 or V-biasR 530. Elements 210A-C are each, for example, approximately 300 microns wide, and if V-biasL 540 and V-biasR 530 are of equal magnitude and opposite sign, the elevation section of elements 210A-C illustrated would be essentially off.

Figure 7:
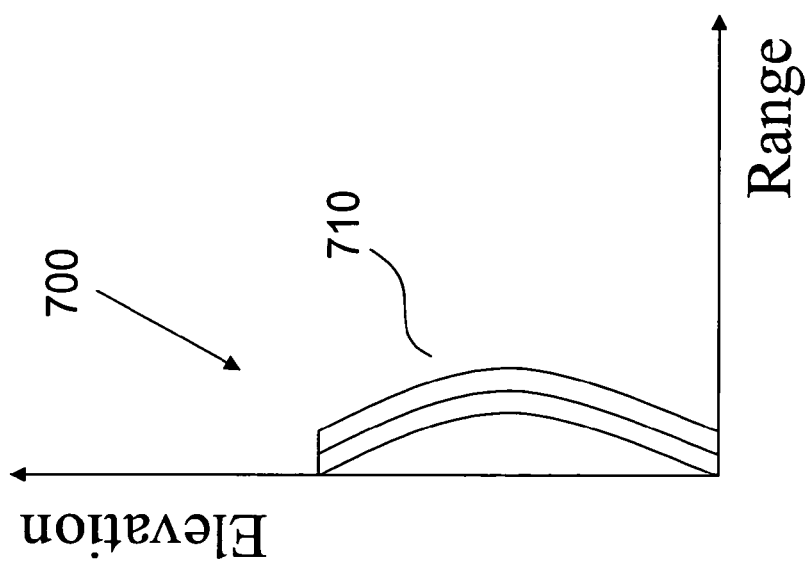
FIG. 7 illustrates a cross-sectional view of a curved microfabricated ultrasonic transducer for use in 3-D systems according to an embodiment of the present invention.

In yet another embodiment of the present invention, the electronically scanned image cross-sections, described above, are combined with transducer curvature to expand the 3-D field of view of the imager. FIG. 7 shows the curvature of this embodiment. As shown in FIG. 7, the transducer array 700 is curved to be convex 710 in the radiating range direction. However, as will be apparent to those skilled in the art, other curvatures in other directions, as well as combinations of curvatures in multiple directions, are all possible and are meant to be within the scope of the present invention.

In yet another aspect of the present invention, the translation of the elevation aperture is effected over only a very small range of the elevation aperture but with a translation resolution of approximately ½ of a wavelength. This small translation may not be practical for 3-D imaging with an acceptable field of view, but is very useful to improve the quality of two dimensional images. For example, the images formed from sufficiently close but distinct elevation regions (sufficiently close being defined to be a dimension that is anatomically insignificant, which in most instances means sub-millimeter) of the aperture could be correlated or otherwise processed in order to remove the effects of uncorrelated signals, thus improving the crispness of the image.

One skilled in the art will recognize that with the embodiments presented thus far, the off-region of the elevation aperture will present parasitic capacitance to the turned-on section of the aperture. While this additional parasitic capacitance is not problematic from a fundamental perspective, a further aspect of the present invention is the reduction of the effect of such parasitic capacitance in the received signal-to-noise ratio of the azimuth channels. In another embodiment of the present invention, a charge-sense amplifier is provided in the receive path of each azimuth element. Because parasitic capacitance does not affect the total amount of charge that the MUT moves when receiving a sound wave, such a configuration does not suffer from signal-to-noise degradation.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that while currently commonly available imaging equipment and software prefers transducer elements to be aligned in azimuth, other transducer geometries, such as annular transducers, may become significant. Thus, even though an example is described for a rectangular aperture with transmit-receive channels in azimuth and bias control in elevation, different configurations of bias control might be desirable and are in the scope and spirit of the invention. Additionally, although elevation curvature has been described as convex for providing an expanded field of view, it will be apparent to those skilled in the art that other surfaces are possible. For example, concave curvature can provide increased slice thickness resolution, albeit at the cost of field of view. It is intended that the appended claims include such changes and modifications.

What is claimed is:

1. A method of obtaining imaging data for rendering a 3-d image using a capacitive microfabricated transducer array having a plurality of transducer elements, and a plurality of transducer sub-elements within each transducer element that correspond to a plurality of elevation apertures, wherein adjacent sub-elements within the plurality of transducer elements correspond to the same elevation aperture and wherein each transducer sub-element includes at least one transducer cell, the method comprising the steps of:

selecting at least one of the plurality of elevation apertures;

scanning the transducer array at the selected one elevation aperture, the step of scanning including:

biasing transducer sub-elements in order to substantially turn off elevation apertures other than the selected elevation apertures;

detecting image data from the selected one elevation aperture; and outputting the detected image data; and repeating the steps of selecting and scanning for a plurality of different elevation apertures in order to provide the imaging data required for rendering of the 3-d image.

2. The method according to claim 1, wherein the step of selecting selects only one of the plurality of elevation apertures, and the step of scanning includes biasing transducer sub-elements in order to substantially turn off all elevation apertures other than the selected one elevation aperture.

3. The method according to claim 2 wherein the biasing of each elevation aperture applies a zero bias to each transducer cell that is not associated with the selected one elevation aperture.

4. The method according to claim 2 wherein the biasing of each elevation aperture applies a large bias to pin a vibrating drum associated with each transducer cell that is not associated with the selected one elevation aperture.

5. The method according to claim 2 wherein the biasing of each elevation aperture applies an alternating bias to elevation row bias lines associated with the selected one elevation aperture.

6. The method according to claim 1, wherein a size of the selected at least one elevation aperture increases over a period of time during which the step of detecting takes place.

7. The method according to claim 6, wherein an adjacent elevation aperture is used to increase the size of the selected one elevation aperture.

8. The method according to claim 1, wherein the step of outputting uses a same output circuitry for output of the image data associated with each different elevation aperture.

9. The method according to claim 1 wherein the step of scanning the selected one elevation aperture further includes Fresnel focusing to improve the elevation focus, the Fresnel focusing inverting by 180 degrees the bias amplitude of certain elevation row bias lines associated with the selected one elevation aperture.

10. The method according to claim 1, wherein the step of selecting selects a plurality of different elevation apertures, and, wherein each of the selected elevation apertures encode received data differently.

11. The method according to claim 10, wherein the step of scanning further includes transmit firings of differing frequency bands for each of the different elevation apertures, and each different elevation aperture encodes receive data by frequency band.

12. The method according to claim 1, further including a step of curving the transducer array such that a same curvature is maintained during the steps of scanning and detecting.

13. An apparatus capable of obtaining image data for rendering a 3-d image comprising:
  a capacitive microfabricated transducer array having a plurality of transducer elements, and a plurality of transducer sub-elements within each transducer element that correspond to a plurality of elevation apertures, wherein adjacent sub-elements within the plurality of transducer elements correspond to the same elevation aperture and wherein each transducer sub-element includes at least one transducer cell, and wherein each of the plurality of transducer sub-elements has an aperture size that allows for obtaining a slice of image data for a predetermined frequency band of interest; and
  means for scanning the array at different elevational apertures to obtain slices of the image data required for rendering of the 3-d image;
  wherein the means for scanning includes a biasing circuit that biases certain transducer sub-elements within the elevation aperture currently being scanned, and substantially turns off elevation apertures other than the elevation aperture currently being scanned.

14. The apparatus according to claim 13 further including output circuitry that outputs detected image data, the same output circuitry being used for the output of the image data associated with each different elevation aperture.

15. The apparatus according to claim 13 wherein the transducer array is curved.

16. The apparatus according to claim 13 further including a plurality of elevation row bias lines associated with each sub-element, and wherein the bias amplitude of certain of the elevation row bias lines is inverted by 180 degrees to achieve Fresnel focusing.

17. The apparatus according to claim 13 wherein the means for scanning includes means for increasing the aperture size over a period of time during which detection of the image data associated with one elevation aperture takes place.

* * * * *